Patented June 1, 1954

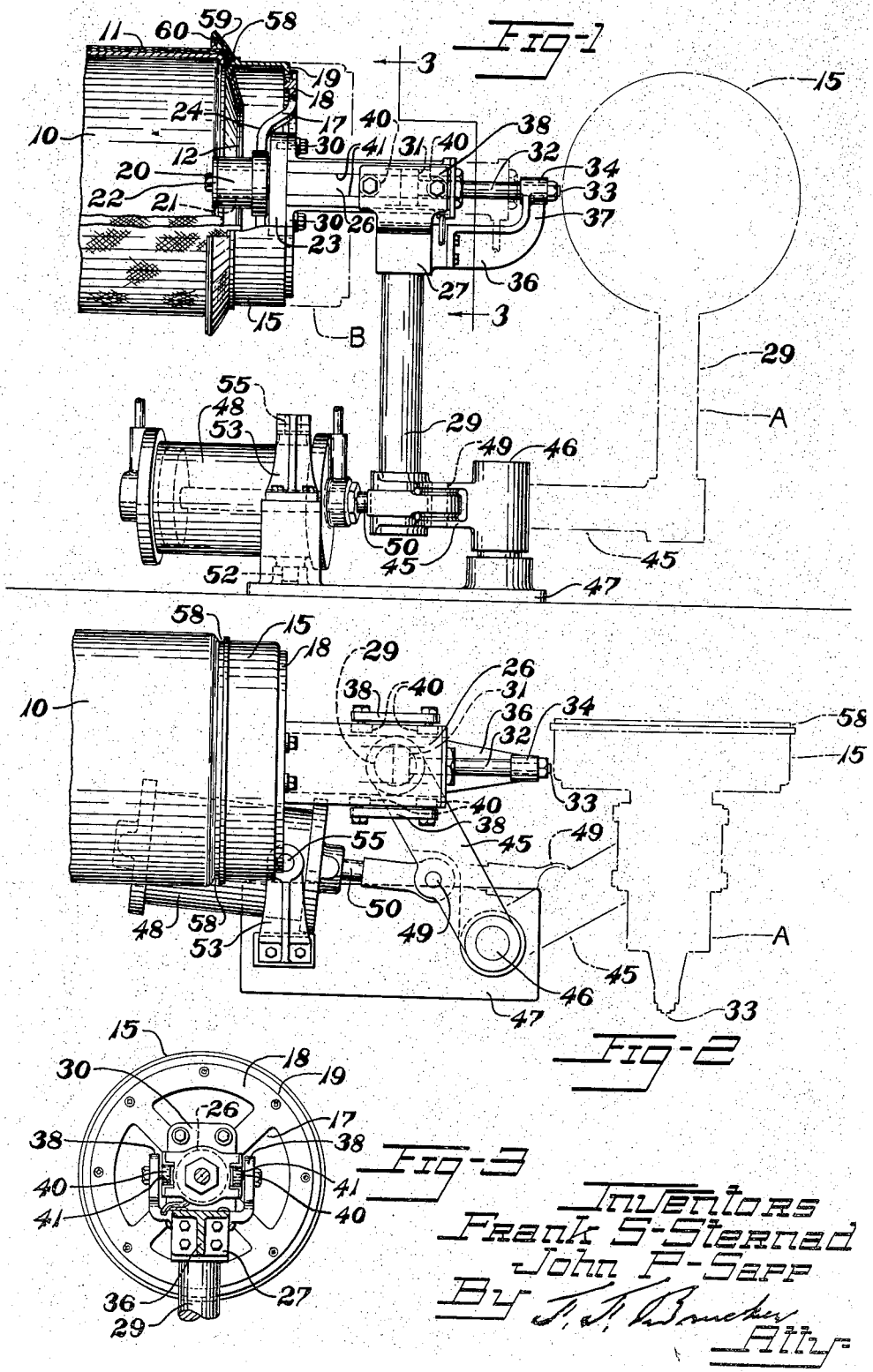

2,679,884

UNITED STATES PATENT OFFICE 2,679,884

TIRE BUILDING APPARATUS

Frank S. Sternad, Cuyahoga Falls, and John P. Sapp, Kent, Ohio, assignors to The B. F. Goodrich Company, New York, N. Y., a corporation of New York Application April 11, 1951, Serial No. 220,394

9 Claims. (Cl. 154—9)

This invention relates to tire-building apparatus and more especially to apparatus for positioning bead cores in a tire casing during its construction.

In the manufacture of tire casings by the "flat-band" method which has been generally accepted throughout the industry, the various plies of rubber-impregnated cord or fabric tire-building materials have been assembled on a collapsible, cylindrical building drum mounted on the unsupported end of a cantilever-like shaft which rotates the drum. The under-bead plies have been positioned on the drum first with the marginal edges of these plies turned inwardly around each end of the drum toward the rotational axis of the drum to receive an annular bead core which must fit over these edges exactly concentrically about the rotational axis of the drum. In a finished casing these edges have been turned outwardly around the bead cores and after the additional plies have been assembled in proper relation the drum has been collapsed and the finished casing has been removed by pulling the casing over the outboard or free end of the drum.

It has been proposed to support these bead cores on suitable rings adjacent the ends of the drum and to locate the bead cores in the casing by moving the rings into contact with the fabric at the ends of the drum at the desired time. But in order to permit removal of a finished casing it has been necessary to mount the bead-placing ring at the outboard end of the drum so that it can be moved to a position sufficiently clear of the building drum to permit the finished casing to be removed from the drum. Satisfactory bead-setting apparatus has been difficult to design since the outboard ring must be moved to a position away from the drum where it won't interfere with the tire-builder or other production activities in the vicinity and yet the outboard ring must be brought into operating position quickly when so desired.

It is an object of the present invention to provide bead-setting apparatus for the outboard end of the drum which is movable toward and away from the building drum in a novel manner and which is particularly rigid in its construction.

Another object is to provide such apparatus which is normally located in a position where it does not interfere with the work of a tire-builder or other plant activities or the removal of a tire casing from the building drum and yet may be brought into operative position adjacent the drum quickly.

Another object is to provide a bead-placing ring which is movable linearly against the end of the drum so that a bead core is accurately aligned on the drum.

A further object is to provide such apparatus in which the bead-placing ring is movable linearly relative to the ring-supporting mechanism and the ring and supporting structure are movable as a unit toward and away from the building drum.

These and other objects will be apparent from the following description of the drawings in which:

Fig. 1 is a front elevation of apparatus constructed according to and embodying this invention;

Fig. 2 is a plan view of the apparatus of Fig. 1; and

Fig. 3 is a sectional view taken on the line 3—3 of Fig. 1.

In Fig. 1, a collapsible, building drum 10 is shown with its left end partially broken away and with several plies 11 of tire-building material assembled on the cylindrical surface of the drum. The marginal edges 12 of these plies are turned inwardly around the outboard end of the drum toward its rotational axis. It is understood that the drum is supported at the end of a horizontal shaft (not shown) which extends axially into the drum from its inboard side which in the drawings is broken away, and the drum is rotated by this shaft. At the outboard end of the drum bead-setting apparatus is shown in full lines in its operative position adjacent the drum and the position of the apparatus when it has been moved as far away from the drum as possible is indicated in chain-dotted lines marked "A."

The bead-setting apparatus includes a bead-placing ring 15 which is generally cylindrical and which is approximately equal in diameter to the diameter of the building drum. The ring 15 is removably mounted on a spoked spider 17 having a continuous peripheral flange 18 which is fastened to a radially-inwardly directed flange 19 around the back of ring 15. At the radial center of spider 17 there is a hub 20 which is rotatably mounted on a horizontal stub shaft or spindle 21 and which is secured to this spindle by a plate 22 which encloses the front end of the hub and is bolted to the end of spindle 21. The spindle 21 is formed integrally with and is perpendicular to a vertical plate 23, one side of which fits against the back end of the hub 20 so that the hub is prevented from moving axially along spindle 21 by the plates 22 and 23. The hub 20 contains suitable bearings (not shown) so that the ring 15 is freely rotatable on the spindle and the spokes of spider 18 are bent inwardly at 24 so that hub 20 is offset inwardly from the radial flange 19 and plate 23 fits inside and is surrounded by ring 15, thereby making the structure advantageously compact.

To impart linear movement to ring 15 so that the ring may be pushed directly against the end of the drum when the ring is axially aligned with the drum, the spindle 21 is horizontally supported in a horizontal plane through the rotational axis of the building drum by a fluid-operated, pressure cylinder 26 which, in turn, is slideably supported by a bracket 27 rigidly fastened at the upper end of a vertical column 29. The cylinder 26 is operable to move the ring 15 relative to the column 29 so that the ring 15 is pressed directly against the end of the drum and the bead-core is located exactly concentrically around the rotational axis of the building drum. The cylinder 26 is formed with a pair of flanges 30—30 at its enclosed end, each of which is bolted to the back of plate 23 in a position such that the cylinder is axially aligned with the spindle 21 but on the opposite side of the plate 23. This cylinder is of the double-acting type and has a reciprocable piston 31 inside it which operates a piston rod 32 which projects outwardly from the end of the cylinder away from plate 23. The end 33 of piston rod 32 outside the cylinder is rigidly fastened in a boss 34 at the end of arm 36 which extends laterally from bracket 27 and is curved upwardly at 37 to receive the piston rod.

The cylinder 26 fits between a pair of upright plates 38 (Fig. 3) on the bracket 27 and is slideably supported between these plates on two pairs of rollers 40—40 which are mounted on the inner surfaces of the plates 38 opposite each other. Each pair of rollers 40—40 fits into a track 41 formed parallel to the axis of the cylinder along the adjacent side of the cylinder. When fluid is admitted into one end of cylinder 26, the pressure of the fluid against piston 31 moves the cylinder 26 relative to the rigidly-fastened piston rod 32 and the tracks 41—41 roll across the tops of the pairs of rollers 40—40 to support the cylinder.

In this manner the cylinder 26 is adapted to move the bead-placing ring 15 and its supporting structure relative to the column 29 and axially toward or away from the building drum 10 depending on the end of the cylinder into which the fluid pressure is admitted.

Ordinarily the linear distance through which the ring 15 is moved by the cylinder 26 is relatively short, the chain-dotted lines in Fig. 1 marked "B" indicating the closest position that the ring 15 may be moved toward the column 29.

In order to move the ring 15 and the column 29 to a position where it is sufficiently clear of the end of the building drum to permit a tire casing to be removed from the drum, a crank-arm 45 is rigidly secured to the bottom of column 29 and is substantially perpendicular to the column (see Fig. 2). The outer end of the crank is pivotally fastened to a vertical pivot post 46 on a base plate 47 which may be fastened to the base of the machine or to any suitable means where the pivot 46 is retained in fixed relation to the building drum 10. The crank 45 is movable about the pivot 46 by the operation of a pressure cylinder 48 having a piston rod 50 which is pivotally connected to the crank 45 at numeral 49 intermediate the ends of the crank. This cylinder 48 is supported by a pivot 52 on base plate 47 and by a curved arm 53 which projects upwardly from base plate 47 and around one side of the cylinder 48. The upper end of arm 53 is pivotally connected to the cylinder by a pivot 55 located vertically above pivot 52 so that the cylinder is free to swing about a vertical axis through the pivots 52 and 55 as the crank 45 swings around pivot 46 to adjust the position of the cylinder to conform to the path along which the end of the piston rod moves with the crank 45.

The cylinder 48 is of the double-acting type and when fluid is admitted into the cylinder to extend the piston rod 50 from the cylinder, the piston rod swings the crank 45 about the vertical pivot 46 to move the column 29, the ring 15 and the mechanism which connects the ring to the top of the column as a unit arcuately away from the operative position shown in full lines in Figs. 1 and 2 to the chain-dotted position marked "A" in these figures. The weight of the ring 15, column 29, etc., is advantageously carried by the base of the machine in the preferred apparatus and the movement of the column 29 is a translational and rotative movement which maintains the column in a vertical position so that the spindle 21 is always moved in a horizontal plane through the rotational axis of the building drum 10. This insures that the ring 15 will be in axial alignment with the building drum when the ring is brought into operative position by operating cylinder 48 to retract piston rod 50 into it.

Any suitable type of bead-placing ring may be used. The preferred ring 15 shown has an annular cavity around the hub 20 inside the ring in which a bead core may be stored until it is ready to be used. The ring 15 is also formed with a groove 58 around the edge of the drum as shown in Fig. 1 to receive a bead core 59. The bead core is ordinarily enclosed in a longitudinal fold of a flipper strip 60, the marginal edges of which are pasted together away from the bead core and then these edges are united with the plies of the tire to fasten the bead core in place after the bead core is positioned in the casing.

In operation of the apparatus the bead-placing ring 15 with a flippered bead core 59 positioned in groove 58 will be normally supported by the apparatus in the dotted position "A" while the tire-builder assembles the under-bead plies 11 on the building drum. The tire-builder then operates suitable valve mechanism (not shown) which operates cylinder 48 to retract piston rod 50 into it and swing crank 45 around pivot 46 so that the column 29 is moved arcuately into the full-line position shown in Fig. 1. At this point in the operation the spindle 21 will be coaxially aligned with the rotational axis of the drum but the cylinder 26 will be close to boss 34 of arm 36 in the dotted position shown in Fig. 1 so that ring 15 is in position "B" away from the drum. Fluid is then admitted to cylinder 26 so that the cylinder moves linearly away from the fixed end of its piston rod 32 and rolls across the rollers 40—40 toward the building drum to press the flippered bead core 59 on ring 15 against the end of the drum covered by the inwardly-turned edges 12 of the plies 11. The drum is ordinarily rotating at relatively high speed when this operation occurs so that the ring 15 is rotated by the drum about the spindle 21 immediately upon contact with the drum. The tire-builder then forms or stitches the edges of the flipper strip downwardly against the plies 11.

After the flipper strip is in place the cylinder 26 is operated to move through bracket 27 in the opposite direction to pull the ring 15 linearly away from the drum into position B. Thereafter cylinder 48 is operated to extend the piston rod 50 against crank 45 to move the ring 15, column 29, etc. to position A where the ring is sufficiently clear of the drum so that the casing may be removed. In position A the ring does not interfere with the other operations performed by the tire builder. Suitable control means may be provided to operate the cylinders 26 and 48 automatically and in the proper sequence to perform the bead-placing operation quickly.

With the present apparatus the building drums may be advantageously changed from time to time to build different size tires without affecting the operation of the bead-setting apparatus. If a drum of different diameter is used, a bead-placing ring of corresponding size may be readily fastened to the spider 17. If a longer or shorter drum is used the cylinder 26 is operable to move the bead-placing ring 15 linearly through the distance necessary to bring the ring into contact with the drum. No adjustments, changes, etc. of any sort are needed for the mechanism for effecting the translational movement of the column 29, etc. or for the control means at the top of the column which moves the bead-placing ring 15 linearly when different size drums are used.

It is to be understood that while the outboard placing ring is being employed to place beads at the outboard end of the drum, a corresponding bead-placing ring is employed at the inboard end of the drum to locate the opposite bead. However this inboard ring does not necessarily require the same manipulation as the outboard ring and therefore does not concern this invention.

Variations may be made in the preferred apparatus without departing from the scope of the invention as it is defined in the following claims:

We claim:

1. Tire-building apparatus comprising a building drum supported for rotation about its axis, a bead-placing ring positionable at an end of said drum, a spindle for rotatably supporting said ring, said ring being mounted on said spindle for free rotation about its axis, a vertical column for supporting said spindle with its axis in the horizontal plane of the axis of said drum, power-operated means mounted on said column and engaged with said ring for moving said bead-placing ring and its spindle toward and away from said drum while maintaining alignment of the axes of said spindle and said drum, and means for effecting a translational and rotative movement of said column while preserving the vertical position of the column to effect a swinging movement of said spindle while maintaining its axis in said horizontal plane to further remove said ring from the vicinity of the end of said drum.

2. Tire-building apparatus comprising a building drum supported for rotation about its axis, a bead-placing ring positionable at an end of said drum, a spindle for rotatably supporting said ring, said ring being mounted on said spindle for free rotation about its axis, a vertical column for supporting said spindle with its axis in the horizontal plane of the axis of said drum, power-operated means comprising a fluid-operated cylinder mounted on said column for moving said bead-placing ring and its spindle relative to the column toward and away from said drum while maintaining alignment of the axes of said spindle and said drum, and means for effecting a translational and rotative movement of said column while preserving the vertical position of the column to effect a swinging movement of said spindle while maintaining its axis in said horizontal plane to further remove said ring from the vicinity of the end of said drum.

3. Tire-building apparatus comprising a building drum supported for rotation about its axis, a bead-placing ring positionable at an end of said drum, a spindle for rotatably supporting said ring, said ring being mounted on said spindle for free rotation about its axis, a vertical column for supporting said spindle with its axis in the horizontal plane of the axis of said drum, power-operated means comprising a fluid-operated cylinder mounted on said column for moving said bead-placing ring and its spindle relative to the column toward and away from said drum while maintaining alignment of the axes of said spindle and said drum, and means for effecting a translational and rotative movement of said column while preserving the vertical position of the column to effect a swinging movement of said spindle while maintaining its axis in said horizontal plane to further remove said ring from the vicinity of the end of said drum, said last-named means comprising a crank mounted for swinging movement in a horizontal plane for supporting said column, and a fluid pressure-operated cylinder for swinging said crank.

4. Bead-setting mechanism for a tire-building drum, the mechanism comprising a bead-placing ring engageable with an end of the drum, a column for supporting the ring in an operating position in which the axis of the ring is aligned coaxially with the end of the drum, means connecting the ring to the column for reciprocating the ring translationally relative to the column in a direction coaxially of the end of the drum and to urge the ring against the end of the drum, a base to which the column is connected, and means for moving the column relative to the base when the ring is disengaged from the drum to displace the ring from said operating position to a position more remote from the end of the drum.

5. Bead-setting mechanism for a tire-building drum, the mechanism comprising a bead-placing ring engageable with an end of the drum, a base, means on the base for supporting the ring, said ring-supporting means being pivotally connected to the base and movable relative to the base to shift the ring from a position remote from the end of the building drum to an operating position in which the axis of the ring is aligned coaxially with the drum, and means connecting the ring to said supporting means for reciprocating the ring relative to the supporting means along the axis of the ring in a direction coaxial of the end of the drum to urge the ring against the end of the drum when the ring is in said operating position.

6. Bead-setting mechanism for a tire-building drum, the mechanism comprising a bead-placing ring engageable with an end of said drum, a column for supporting the ring, a base located in fixed relation to the drum, means pivotally supporting the column on the base, means for moving the column pivotally relative to the base to move the ring from a position remote from the drum to an operating position close to the end of the drum in which the axis of the ring is aligned coaxially with the end of the drum, and a fluid-operated pressure cylinder on the column connecting the column to the ring, the pressure cylinder being operable to reciprocate the ring relative to the column in a direction coaxial with the end of the drum to urge the ring against the drum when the ring is in said operating position.

7. Bead-setting mechanism for a tire-building drum having a horizontal rotational axis, the mechanism comprising a bead-placing ring engageable with an end of the drum, a column for supporting the ring in an operating position in which the axis of the ring is aligned coaxially with the end of the drum, means connecting the ring to the column for reciprocating the ring relative to the column in a direction coaxial of the end of the drum to urge the ring against the end of the drum, a base located in fixed relation to the drum, means on the base pivotally supporting the column for movement of the column relative to the base about a vertical axis, and means for moving the column about said vertical axis when the ring is disengaged from the drum to displace the ring from said operating position to a position remote from the end of the drum.

8. Bead-setting mechanism for a tire-building drum, the mechanism comprising a bead-placing ring rotatable about a central axis, a column extending substantially perpendicularly of the axis of the ring for supporting the ring in an operating position in which the axis of the ring is aligned coaxially with the end of the drum, a pressure cylinder connecting the ring to the column for reciprocating the ring relative to the column in a direction coaxial of the end of the drum to urge the ring against the end of the drum, a base located in fixed relation to the drum, a crank-arm mounted on the base and rotatable about a vertical axis for supporting the column, and means for moving the crank about said vertical axis when the ring is disengaged from the drum to move the column and to displace the ring away from said operating position to a position remote from the drum.

9. Apparatus for setting an annular bead core on a tire-building drum, the apparatus comprising a bead-placing ring engageable with an end of the drum, a column for supporting the ring in an operating position in which the axis of the ring is aligned coaxially with the end of the drum, a fluid-operated pressure cylinder connecting the ring to the column for reciprocating the ring relative to the column in a direction coaxially of the drum to urge the ring against the drum, the pressure cylinder having a fluid-receiving portion fastened to the ring and a piston rod projecting therefrom, a bracket on the column for slidably supporting the fluid-receiving portion and an arm extending outwardly from the bracket away from the drum to which the piston rod is engaged whereby the fluid-receiving portion is movable relative to the piston rod in response to a fluid pressure to reciprocate the ring relative to the column.

References Cited in the file of this patent

UNITED STATES PATENTS

| Number | Name | Date |
|---|---|---|
| 1,952,905 | Bostwick | Mar. 27, 1934 |
| 2,393,504 | Stevens | Jan. 22, 1946 |
| 2,394,465 | McChesney | Feb. 5, 1946 |